(12) United States Patent
Lazo

(10) Patent No.: US 7,373,069 B2
(45) Date of Patent: May 13, 2008

(54) FIBER OPTIC TESTER

(76) Inventor: Daniel Otoniel Lazo, 2701 Acorn Pl., Ontario, CA (US) 91761

( * ) Notice: Subject to any disclaimer, the term of this patent is extended or adjusted under 35 U.S.C. 154(b) by 170 days.

(21) Appl. No.: 11/182,370

(22) Filed: Jul. 15, 2005

(65) Prior Publication Data

US 2007/0014526 A1    Jan. 18, 2007

(51) Int. Cl.
*G02B 6/00*    (2006.01)

(52) U.S. Cl. .......................... 385/134; 385/31

(58) Field of Classification Search .................. None
See application file for complete search history.

(56) References Cited

U.S. PATENT DOCUMENTS

| | | | |
|---|---|---|---|
| 3,663,822 A | 5/1972 | Uchida | 250/551 |
| 3,884,585 A | 5/1975 | Lebduska | 356/73.1 |
| 4,834,486 A | 5/1989 | Walker | 385/134 |
| 4,940,892 A | 7/1990 | Fisher et al. | 250/227.24 |
| 5,196,899 A * | 3/1993 | Serwatka | 356/73.1 |
| 5,530,546 A | 6/1996 | Barringer et al. | 356/73.1 |
| 5,570,176 A | 10/1996 | Noel | 356/73.1 |
| 5,694,511 A | 12/1997 | Pimpinella et al. | 385/134 |
| 5,712,942 A | 1/1998 | Jennings et al. | 385/134 |
| 5,731,893 A | 3/1998 | Dominique | 359/379 |
| 5,940,559 A | 8/1999 | Noll | 385/53 |
| 5,960,130 A | 9/1999 | Pimpinella | 385/15 |
| 6,094,261 A | 7/2000 | Contarino, Jr. | 356/73.1 |
| 6,363,198 B1 | 3/2002 | Braga et al. | 385/134 |
| 6,373,562 B1 | 4/2002 | Marsh et al. | 356/73.1 |
| 6,388,741 B1 | 5/2002 | Beller | 356/73.1 |
| 6,412,987 B1 | 7/2002 | Horwitz et al. | 385/56 |
| 6,437,894 B1 | 8/2002 | Gilbert et al. | 398/164 |
| 6,439,776 B1 | 8/2002 | Harrison et al. | 385/53 |
| 6,466,366 B1 | 10/2002 | Dominique | 359/379 |
| 6,496,641 B1 | 12/2002 | Mahony | 385/135 |
| 6,522,804 B1 | 2/2003 | Mahony | 385/24 |
| 6,539,147 B1 | 3/2003 | Mahony | 385/24 |
| 6,721,482 B1 | 4/2004 | Glynn | 385/135 |
| 6,764,221 B1 * | 7/2004 | de Jong et al. | 385/55 |
| 6,862,397 B2 * | 3/2005 | Harres et al. | 385/147 |

* cited by examiner

*Primary Examiner*—Sung Pak
(74) *Attorney, Agent, or Firm*—Harvey Lunenfeld

(57) ABSTRACT

A fiber optic tester for testing at least two fiber optic devices substantially simultaneously, comprising: a housing having a light source and at least one housing connector, the light source interior to the housing; at least one adapter having at least one first connector and at least two second connectors, the at least one first connector removably and matingly connected to the at least one housing connector; the at least two second connectors adapted to removably and matingly connect to at least two fiber optic device input connectors; the fiber optic tester directing light into the at least two fiber optic device input connectors, when the at least two second connectors are removably matingly connected to the at least two fiber optic device input connectors, the presence and/or absence of light from output connectors of the at least two fiber optic devices indicating the condition of the fiber optic devices.

11 Claims, 14 Drawing Sheets

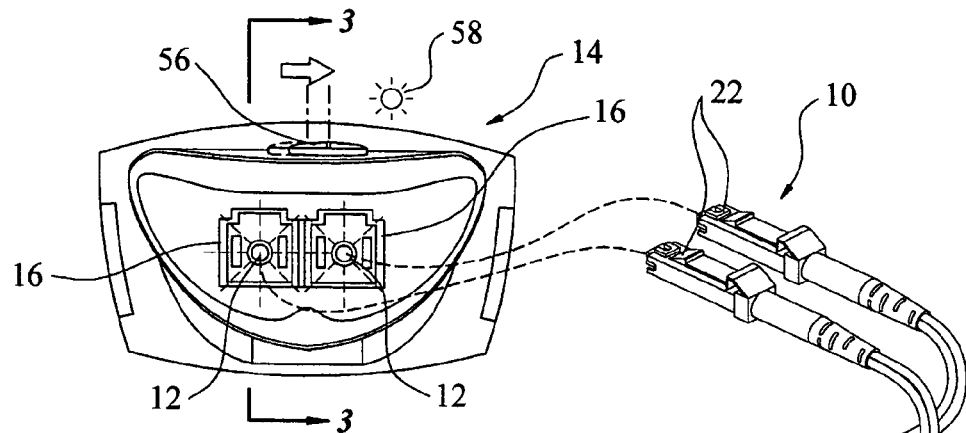
FIG. 6
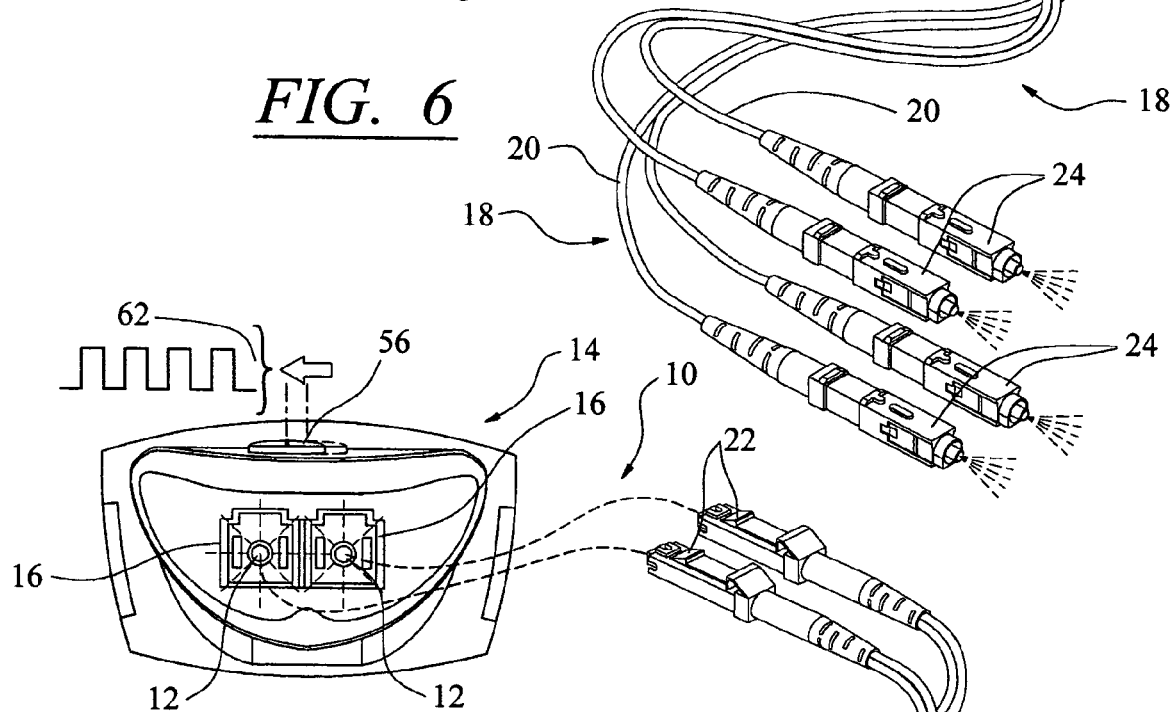
FIG. 7
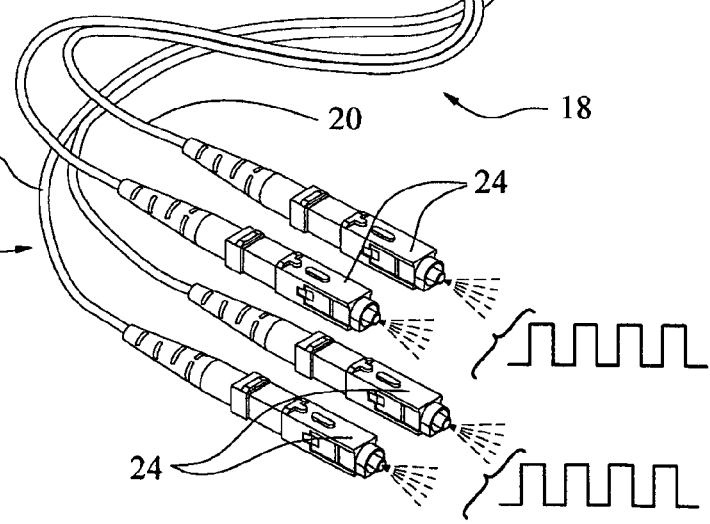

FIBER OPTIC TESTER

BACKGROUND OF THE INVENTION

1. Field of the Invention

The present invention relates generally to fiber optic testers and more particularly to fiber optic testers that may be used in the field.

2. Background Art

Fiber optic cables are used in many systems for transmission of broad bandwidth digital and analogue signals, and are currently in prolific use in networks of all kinds, such as the internet, wide area networks, local area networks, cable, communications, and telecommunications systems. Fiber optic cables have become the transmission medium of choice for these systems.

Construction, testing, installation, and maintenance of fiber optic systems requires equipment that may be used in the field to test the fiber optic cables in a variety of installations and different circumstances. Although certain fiber optic testers have been available, such testers often do not allow for testing a plurality or multiplicity of fiber optic cables, terminations, and devices in the field, simultaneously. Fiber optic testers that have been known are either capable of only testing a single connectorized termination, strand, or cable, are complicated or difficult to use in a field environment, or are permanently installed in large installations for automated testing. As such, it has been difficult to use these fiber optic testers in the field.

Fiber optic test equipment should be quick, versatile, easy and simple to use, easily adaptable for use with different systems and configurations, inexpensive, long lasting, durable, and capable of testing a plurality of fiber optic cables and/or devices simultaneously. Such equipment should be capable of being used for continuity testing and determining whether or not there are breaks in the fiber optic cables being tested, and facilitate speeding up the construction, installation, and maintenance of the fiber optic systems. The fiber optic tester should be a portable handheld fiber optic tester capable of being used in the field.

There is, thus, a need for a fiber optic tester that may be used by a field technician for testing a variety and plurality or multiplicity of connectorized fiber optic cables and/or devices simultaneously. The fiber optic tester should be quick, versatile, easy and simple to use, easily and quickly adaptable for use with different systems and configurations, inexpensive, long lasting, light weight, safe to use, attractive, sturdy, and durable, and capable of being used in the field for testing the fiber optic cables in a variety of installations and different circumstances. The fiber optic tester should be capable of being used as a continuity tester and determining whether or not there are breaks in the fiber optic cables being tested. The fiber optic tester should be a portable handheld fiber optic tester capable of being used in the field Different fiber optic testers have heretofore been known. However, none of the fiber optic testers adequately satisfies these aforementioned needs.

U.S. Pat. No. 6,373,562 (Marsh, et al.) discloses a fiber optic cable tester, which includes a body having an inlet fitting, an outlet and a channel that extends between the inlet fitting and the outlet. A magnification and focusing assembly is mounted within the channel between the inlet fitting and the outlet. A fiber optic cable end fitting is communicably interengaged with the inlet fitting, and light is transmitted through the magnification and focusing assembly and the channel to the outlet. The light is projected from the outlet and against a target area to produce an image, which is indicative of the condition of the fiber optic cable.

U.S. Pat. No. 5,196,899 (Serwatka) discloses a fiber optic test light with multiple connector adapters that may be used for visual continuity testing of fiber optic cables, patch cords, and pigtails, which comprises a light source, an adaptive interface, a power source, and a housing. The adaptive interface comprises a wheel having a variety of fiber optic connectorized end fittings, which may be used to match or connect various fiber optic connectorized endings and also bare fiber to a light source, thus, permitting visual testing for the continuity and integrity of a fiber optic link.

U.S. Pat. No. 6,094,261 (Contarino, Jr.) discloses a method and apparatus for distinguishing various fiber-optic cables from each other in an installation where cables are grouped together, the apparatus comprising a light source for generating a high-intensity, reasonably highly collated, colored, and pulsed light beam. The light is coupled into one end of a fiber-optic cable, whereby an installer can easily observe the corresponding light coming out of the opposite end of the cable to distinguish that cable from the other cables.

U.S. Pat. No. 5,960,130 (Pimpinella) discloses a method of testing splice connections in an optical fiber cable, in which the quality of a splice at a remote location made between an optical cable and a subsequent optical cable includes connecting a first optical switch to the optical fibers contained within the cable. The first optical switch is connected to the optical fibers at a central office from where the optical cable originates. The first optical switch is connected to test equipment at the central office, wherein the first optical switch is capable of selectively connecting the test equipment to each of the optical fibers. A second optical switch is connected to the optical fibers in the subsequent optical cable on the opposite side of the splice. Portable test equipment is optionally connected to the second optical switch at the remote location. A portable controller is also taken to the remote location. The portable controller is used to control the first optical switch at the central office, via a telecommunications link. As a result, a person splicing an optical cable at the remote location can remotely instruct that cable to be tested in an automated manner from the central office. If the test shows a poor integrity in the splice, the cable can be cut and re-spliced until a quality splice is obtained.

U.S. Pat. No. 5,694,511 (Pimpinella, et al.) discloses an optical switching apparatus and method for use in the construction mode testing of a modular fiber administration system. The device and method for connecting an optical switch to the optical fibers that terminate on a fiber distribution shelf within a fiber administration system includes the optical switch device, which contains a support plate that is shaped essentially the same as the protective cover of the fiber distribution shelf. The support plate of the optical switch device can be joined to a specific fiber distribution shelf by substituting the support plate for the protective cover. An optical switch is affixed to the support plate, wherein the optical switch is sized not to extend beyond the peripheral boundaries of the support plate. As a result, when the support plate is placed over the fiber distribution shelf, the optical switch joined to the support plate does not obscure any other fiber distribution shelf in the fiber administration system.

U.S. Pat. No. 6,437,894 (Gilbert, et al.) discloses a fiber distribution shelf assembly for a fiber administration system having integral line tracing capabilities. The fiber administration system includes at least one fiber distribution shelve that supports a plurality of optical connection ports, each of which contains a sensor for detecting the presence of an optical coupling in that optical connection port. A systems controller is coupled to the sensor of each of the optical connection ports, the systems controller being capable of automatically determining from the sensors whether or not an optical coupling is present in each of the optical connection ports.

U.S. Pat. No. 5,530,546 (Barringer, et al.) discloses a method and apparatus for testing fiber optic jumpers, in which a station for testing fiber optic jumper cables includes four indexing plugboard stations. A single cable to be tested is typically attached to extend between two of the plugboard stations. Each plugboard station includes three columns of plug positions, corresponding to three styles of connectors, which may be used at the ends of the cable to be tested. An upper row and a central row of plug positions correspond to the contact types (PC or APC), which may be used. An indexing mechanism is provided to align one of the plug positions in the central row with a reference cable extending from the plugboard station. Reference jumpers extend from the upper row, being docked in a lower row of plug positions if the cable to be tested is connected to the central row, or being plugged into the central row if the cable to be tested is connected to the upper row. The reference cable extending from each of the plugboard stations is brought into and out of contact with one of the central-row plugboard positions, facilitating a sequence of tests. The reference cables from two of these plugboard stations are connected through an optical switch to an optical time domain reflectometer (OTDR), while the other two reference cables are simply connected to connectors at their far ends. A computer controls indexing the plugboard stations, and brings the reference cables into engagement according to a preferred sequence.

U.S. Pat. No. 3,884,585 (Lebduska) discloses fiber break detection methods for cables using multi-fiber optical bundles. A method and apparatus for detecting and assessing the light transmitting integrity of the individual fibers in a multi-fiber optic cable bundle is achieved by edge illuminating the bared fiber ends at an input terminal cable end, and detecting the quality of transmitted light emanating from the bared ends of the fibers at a receiving terminal cable end, The transmitted light emitting from the face of the receiving cable end is magnified by a microscope or the like. A second light source illuminates the surface of the receiving cable end to enable the faces of the broken fibers to be distinguishable from the remaining background. The end faces of the broken fibers will appear as dark, spots since the input illumination is absent, being interrupted by the break in the fiber somewhere along its length. The faces of the light transmitting unbroken fibers will appear as bright spots. A suitable camera attachment may be provided in conjunction with the microscope to obtain a permanent record of the magnified image of the output cable end.

U.S. Pat. No. 6,466,366 (Dominique) discloses a microscope with end plate and adapter for viewing multi-fiber connectors, in which a portable microscope includes an end plate and pivotable adapter for improved inspection of multiple fiber optic cables in a single connector. The end plate is mounted on the head unit housing of the microscope, and the adapter is mounted on a pivot cylinder extending from the end plate, the adapter including a jig for receiving and retaining a connector. Each fiber optic cable in the connector can be inspected one at a time by pivoting the adapter, so that each of the fiber optic cables is in view through the microscope. The adapter also includes an aperture, which is positioned over the head of the fastener used to connect the end plate to the housing. The pivoting movement of the adapter is limited by the engagement of the aperture against the head of the fastener. Various connectors are also discussed.

U.S. Pat. No. 5,731,893 (Dominique) discloses a portable microscope for inspecting fiber optic cable, in which a portable microscope includes an end plate with a reflective inner surface for improved inspection of the end surface of a fiber optic cable at a connection point in a fiber optic system. The end plate is mounted on the head unit housing of the microscope, and includes a tubular aperture for receiving and positioning the end of the fiber optic cable for microscopic inspection. A bowl is formed about the tubular aperture on the inner surface of the plate to direct more light to the end of the fiber optic cable. The outer surface of the plate includes a positioning tube for receiving a ferrule with the end of the fiber optic cable and directing the ferrule and fiber optic cable through the aperture into the bowl.

U.S. Pat. No. 6,412,987 (Horwitz, et al.) discloses an adapter system usable in conjunction with a fiber optic termination inspection microscope to inspect fiber optic cable end connectors. A plurality of different adapters for a fiber optic termination inspection microscope permits the microscope to be used with a plurality of cable connectors, where each cable connector has one or more cable termini. The purpose of the microscope is to inspect a cable terminus to determine if such is clean and polished, in order to insure low attenuation levels. If the cable terminus is dirty or scratched, the cable terminus can be replaced or repaired. An indicator can be used to disclose to the user exactly which cable terminus is being inspected.

U.S. Pat. No. 5,570,176 (Noel) discloses an apparatus for converting a multimeter to an optical power meter. An apparatus to convert optical power into a voltage includes a wavelength selector switch and can plug itself into a multimeter. The converter apparatus comprises an annular connector, which adapts onto optical fiber connectors, which may be of various diameters. A photo-diode at the receiving end is large enough, so as not to require that the optical fiber be at a 90 degree angle to the photo-diode surface, so the surface gets a reasonable reading. A switch on the converter housing allows calibration of the converter at the appropriate wavelength to be used for the test. Optical power is then converted and sent as a voltage value through a pair of banana plugs that can be affixed to the multi-meter. A battery within the housing provides power to the converter, so that an external power source is not needed.

U.S. Pat. No. 6,439,776 (Harrison, et al.) discloses a fiber optic loop support, in which a testing device for fiber optic system devices includes a fiber optic loop support that holds a single-mode optical fiber, such that an empirically determined loss characteristic associated therewith is unvarying from use to use. In particular, an optical fiber forms a loop, and the loop is supported within a rigid slotted housing. The housing effectively precludes bending losses. Additionally, the housing is small and portable, so that field testing may also be performed. Various connectors are also discussed.

U.S. Pat. No. 6,388,741 (Beller) discloses a system for localization of faults in an optical fiber, in which an optical fiber is provided with a plurality of reflecting events spatially allocated along the optical fiber, for localizing possible faults in the optical fiber. Possible faults are localized by emitting a signal into the optical fiber, measuring the reflected signals, and comparing the measured reflected signals with expected signals representing the optical fiber without faults. If there are one or more faults in the optical fiber, the measured reflected signals at a distance behind each one of the one or more faults will show at least a different amplitude, or even disappear, with respect to the expected signals. The expected signals can be received or determined, e.g., from a previous measurement, such as an acceptance measurement, or can be calculated or otherwise received from theoretical analysis (e.g. simulation or modeling) and/or from information about the fiber, such as physical properties.

U.S. Pat. No. 6,363,198 (Braga, et al.) discloses an optical fiber cable distribution shelf with cable management system. The optical fiber cable distribution shelf comprises a cable management clip system in a rear bay, as well as a cable management clip system in the front bay of the shelf. The cable management clip systems each include at least one pair of controlled bend clips and at least one divider clip positioned therebeneath, in order to control bending of and to route optical fiber into and out of the cable distribution shelf, without imparting any undesirable fiber damage or related attenuated signals, owing to uncontrolled bending of the fibers. The optical fiber cable distribution shelf provides for installing a high density of fiber optic connections into an optical fiber cable distribution shelf.

U.S. Pat. No. 5,712,942 (Jennings, et al.) discloses an optical communications system having distributed intelligence, in which a distributed intelligence optical fiber communications system is capable of automated and continuous monitoring and testing of the optical fibers and their connections within the optical fiber distribution frames therein. The optical communications system has an optical distribution frame, including interconnection modules having actively intelligent microcontrollers thereon. The distribution frame includes electrical and optical interconnection fabrics between the distributed intelligence located on the interconnection modules and a host located outside of the distribution frame. The distributed intelligence interconnection modules allow monitoring, testing and/or related activities of the optical communications system to be performed locally at the interconnection modules. When used in combination with the electrical and optical interconnection fabrics, the modules reduce optical fiber routing, and enable effective monitoring and testing operations to be performed, while maintaining compatibility with existing conventional cross-connect, switching and network architectures.

U.S. Pat. No. 5,940,559 (Noll) discloses a fiber-optic test probe and connector adapter for testing fiber-optic connector harnesses and fiber-optic terminations, for example, in fiber optic connector assemblies. A single multi-channel connector adapter is provided that is adapted to be attached to the fiber-optic connector to be tested. In one embodiment of the invention, the connector adapter includes an alignment sleeve that enables the terminus of the fiber-optic connector to be tested to be axially aligned with the terminus of the test probe. In order to eliminate air gaps between the respective termini, the fiber-optic test probe and connector adapter are configured to provide axial compression forces between the mating termini in a test position, in order to eliminate air gaps therebetween, and thus reduce transmission losses. The test probe may be provided with strain relief and anti-bending boot, which prevents radial forces from misaligning the termini. The test probe includes a release sleeve that allows the test probe to be quickly released from its locked position. In an alternate embodiment of the invention, the alignment sleeve may be formed as part of the test probe. A probe calibration adapter, or feed-through adapter, is also provided, which enables two test probes to be coupled together for purposes of calibration. The feed-through adapter is configured to provide alignment between the respective termini of the test probe termini, while providing axial compression forces therebetween, similar to the adapter to reduce transmission losses, and thus improve performance while providing repeatability of the test measurements.

U.S. Pat. No. 4,940,892 (Fisher, et al.) discloses a optical discontinuity monitor system. A system for monitoring discontinuities in optical power transmitted through a fiber optic connector subjected to environmental stress is disclosed. Discontinuity events are defined in terms of amplitude and duration. The monitoring system comprises a detector unit, a fiber optic interface unit, and a discontinuity monitor. The detector unit converts the optical signal supplied by the fiber optic connector to electronic form. The fiber optic interface unit determines the amplitude of discontinuities, and the discontinuity monitor determines the duration of discontinuities.

Various fiber optic infrastructures, connectorized fiber optic drops, connectorized terminations, connectors, and fiber optic cables have been disclosed.

U.S. Pat. No. 6,721,482 (Glynn) discloses a telecommunications fiber optic infrastructure.

U.S. Pat. Nos. 6,539,147 and 6,522,804 (Mahony) disclose connectorized inside and outside fiber optic drops, in which connectorized fiber optic drops facilitates the deployment of fiber to the home by connecting a fiber optic interface device to an optical network terminal, the fiber optic drop including a sheath, transition fittings, pigtails, fiber optic connectors, and a fiber optic strand. The sheath is positioned over a middle section of the fiber optic strand. The transition fittings are attached to the fiber optic sheath proximate to both ends of the drop. The pigtails attach to the transition fittings and enclose the fiber optic strand from the transition fittings to the ends of the fiber optic strand, where the fiber optic connectors are attached to the fiber optic strand and the pigtails. If the drop contains more than one fiber optic strand, then one set of pigtails with connectors is provided for each fiber optic strand. Connectorized terminations are also discussed.

U.S. Pat. No. 6,496,641 (Mahony) discloses a fiber optic interface device that facilitates the deployment of fiber to the home by connecting a connectorized outside fiber optic drop to a connectorized inside fiber optic drop, the fiber optic interface device including a housing having two ports, termination hardware, routing hardware, and one or more adapters. The housing provides environmental protection and is adapted to be mounted to a customer's house. The two ports receive the outside and inside drops. Positioned above the ports inside the housing, the termination hardware secures the drops to the housing. The routing hardware receives the drops from the ports, routes the drops to the one or more adapters, and stores any extra length in the drops, while maintaining a proper fiber strand bend radius. The one or more adapters connect the outside drop to the inside drop, providing an aligned and stable fiber optic connection that does not require splicing. Connectorized terminations are also discussed.

U.S. Pat. No. 4,834,486 (Walker) discloses a connector sleeve adapter for mounting fiber optic connector sleeves having differing external shapes to a panel having an array of like shaped panel holes. A connector sleeve holder has multiple sidewalls having different shapes, in order to hold differing connector sleeves to a panel.

U.S. Pat. No. 3,663,822 (Uchida) discloses a multi-terminal optical cable, which includes an optical focusing fiber having a refractive index distribution in which the index varies in substantially inverse proportion to the square of the radial distance from the central longitudinal axis of the fiber to its outer periphery. A plurality of input electrical signals is converted into corresponding light signals at one end of the fiber. Those light signals are imaged by the fiber in a one-to-one relationship on an array of light sensing elements at the other end of the fiber at which the light images are reconverted to electrical signals, corresponding to the input electrical signals.

For the foregoing reasons, there is a need for a fiber optic tester that may be used by a field technician for testing a variety and plurality or multiplicity of connectorized fiber optic cables and/or devices simultaneously. The fiber optic tester should be quick, versatile, easy and simple to use, easily and quickly adaptable for use with different systems and configurations, inexpensive, long lasting, light weight, safe to use, attractive, sturdy, and durable, and capable of being used in the field for testing the fiber optic cables in a variety of installations and different circumstances. The fiber optic tester should be capable of being used as a continuity tester and determining whether or not there are breaks in the fiber optic cables being tested. The fiber optic tester should be a portable handheld fiber optic tester capable of being used in the field

SUMMARY

The present invention is directed to fiber optic tester that may be used by a field technician for testing a variety and plurality or multiplicity of connectorized fiber optic cables and/or devices simultaneously. The fiber optic tester is quick, versatile, easy and simple to use, easily and quickly adaptable for use with different systems and configurations, inexpensive, long lasting, light weight, safe to use, attractive, sturdy, and durable, and capable of being used in the field for testing the fiber optic cables in a variety of installations and different circumstances. The fiber optic tester may be used as a continuity tester to determine whether or not there are breaks in the fiber optic cables being tested. The fiber optic tester is a portable handheld fiber optic tester capable of being used in the field A fiber optic tester for testing at least two fiber optic devices substantially simultaneously, each of the fiber optic devices having at least one input connector, at least one output connector, and at least one fiber optic device light path which directs light received at the at least one input connector to the at least one output connector when the at least one fiber optic device light path is unbroken, having features of the present invention comprises: a housing having a light source and at least one housing connector, the light source interior to the housing; at least one adapter having at least one first connector and at least two second connectors, the at least one first connector removably and matingly connected to the at least one housing connector; the at least two second connectors adapted to removably and matingly connect to the at least two fiber optic device input connectors; the housing having a housing light path, which directs light emitted from the light source through the at least one housing connector into the at least one first connector; the at least one adapter having an adapter light path from the at least one first connector to the at least two second connectors, which directs light received from the housing at the at least one first connector to the at least two second connectors and into the at least two fiber optic device input connectors, when the at least two second connectors are removably and matingly connected to the at least two fiber optic device input connectors.

DRAWINGS

These and other features, aspects, and advantages of the present invention will become better understood with regard to the following description, appended claims, and accompanying drawings where:

FIG. 6 is a perspective view of the fiber optic tester shown with selected ones of the adapters of FIG. 2A and shown in constant light output mode;

FIG. 7 is a perspective view of the fiber optic tester shown with selected ones of the adapters of FIG. 2A and shown in strobe light output mode;

DESCRIPTION

Figure 1:
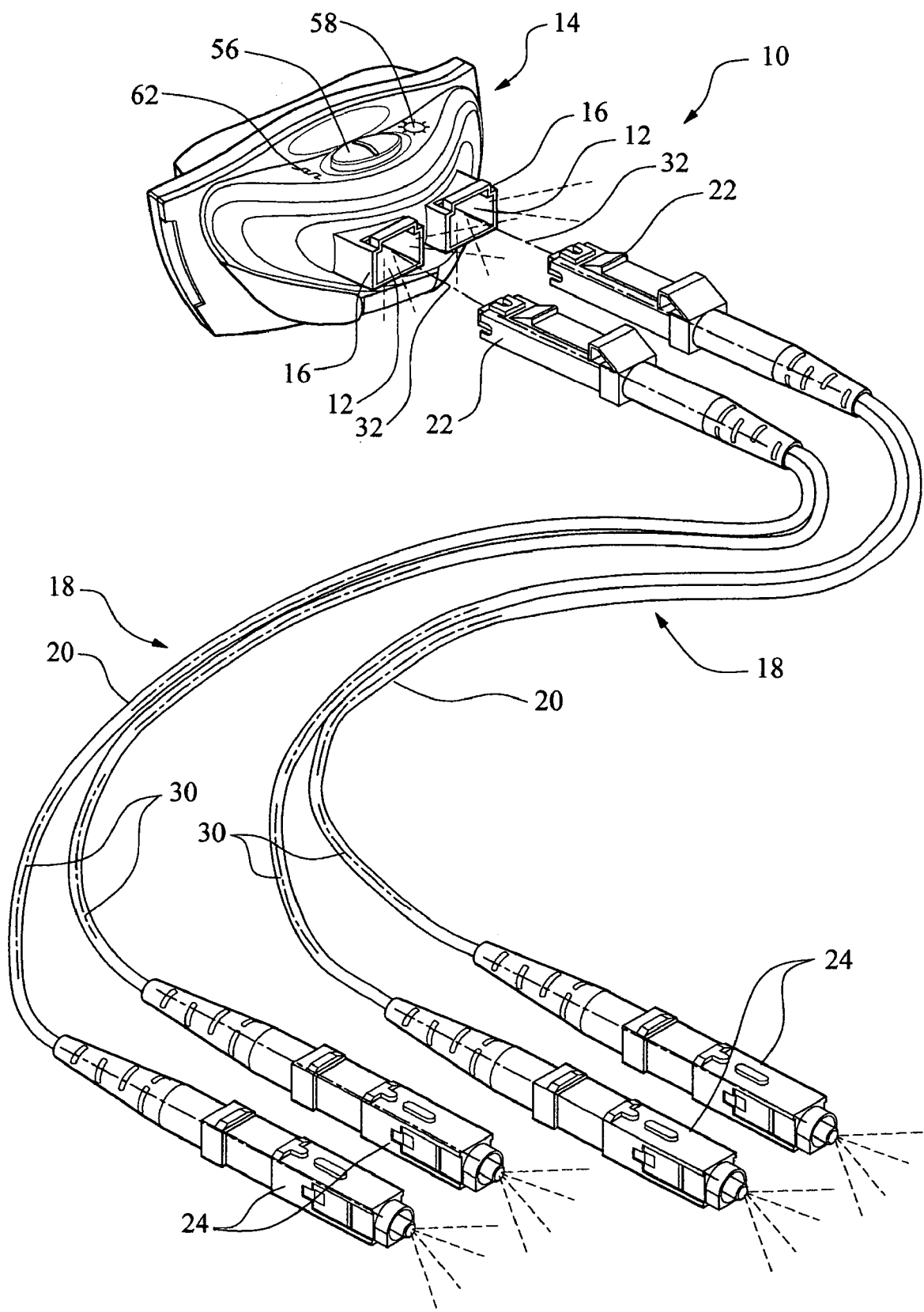
FIG. 1 is a perspective view of a fiber optic tester, constructed in accordance with the present invention.

The preferred embodiments of the present invention will be described with reference to FIGS. 1-14 of the drawings. Identical elements in the various figures are identified with the same reference numbers.

FIGS. 1-12 show an embodiment of the present invention, a fiber optic tester 10, comprising: a light source 12; a housing 14 having the light source 12 interiorly disposed thereto and housing connectors 16; and adapters 18. Each of the adapters 18 has an adapter fiber optic cable 20, a first connector 22 connected to the adapter fiber optic cable 20, and other connectors 24 opposingly connected to the adapter fiber optic cable 20. The first connectors 22 removably mate with the housing connectors 16, and the other connectors 24 are adapted to removably mate with fiber optic connectors 26 connected to fiber optic cables 28 and/or to removably mate with intermediate connectors 67, which mate with the fiber optic connectors 26, and/or to removably mate with a device or devices to be tested.

Light 32 emitted from the light source 12 is directed through light paths 30 and through the intermediate connectors 67, if used, through the fiber optic connectors 26 connected to the fiber optic cables 28 to be tested and/or device or devices to be tested.

In more detail, the light 32 emitted from the light source 12 is directed through the light paths 30, through each of the housing connectors 16, through each of the adapter first connectors 22, through the adapter fiber optic cables 20 through the adapter other connectors 24, through the intermediate connectors 67, if used, through the fiber optic connectors 26 and into the fiber optic cables 28 and/or device or devices to be tested, when the adapter first connectors 22 are connected to the housing connectors 16, the adapter other connectors 24 are connected to the intermediate connectors 67, if used, and the fiber optic connectors 26 are connected to the adapter other connectors 24 or the intermediate connectors 67, if used, and/or the device or devices to be tested.

The fiber optic tester 10 may be used as a continuity tester to determine whether or not there are breaks in the fiber optic cables and/or device or devices being tested. The fiber optic tester 10 is a portable handheld fiber optic field tester.

FIG. 1 shows the fiber optic tester 10 having two adapters 18, each of the adapters 18 having one of the first connectors 22 and two of the fiber optic cables 20 terminated with the other connectors 24. Each of the adapters 18 may be patch cords, which may be standard off the shelf patch cords or other suitable patch cords.

Figure 2A:
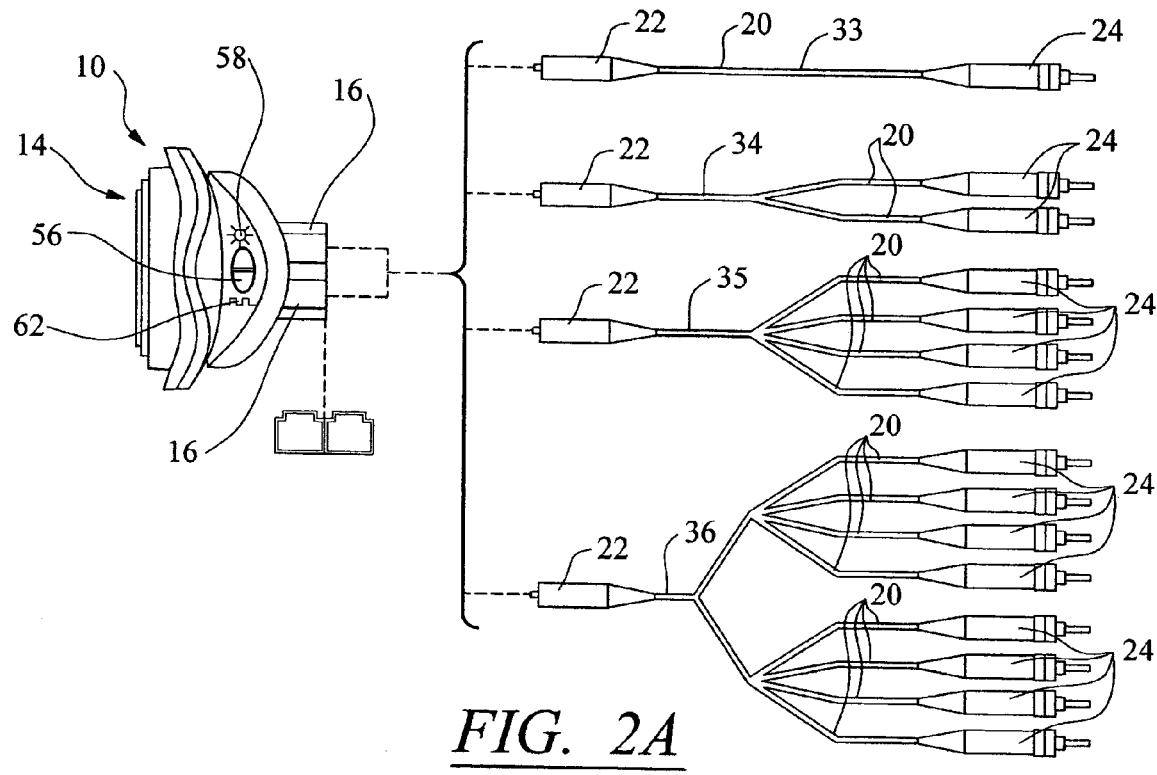
FIG. 2A is a top view of the fiber optic tester showing alternate adapters of the fiber optic tester.

FIG. 2A shows optional alternate adapters 33, 34, 35, or 36 that may be used with the fiber optic tester 10. The adapter 33 has the first connector 22 connected to the adapter fiber optic cable 20 and the other connector 24 opposingly connected to the adapter fiber optic cable 20. The adapter 34 is substantially the same as the adapter 18, and has two of the fiber optic cables 20. The adapter 35 has the first connector 22 and four of the adapter fiber optic cables 20, each of the adapter fiber optic cables 20 having the other connector 24 connected to the adapter fiber optic cable 20 opposing the first connector 22. The adapter 36 has the first connector 22 and eight of the adapter fiber optic cables 20, each of the fiber optic cables 20 having the other connector 24 connected to the fiber optic cable 20 opposing the first connector 22. The optional alternate adapters 33, 34, 35, or 36 may be used in any combination with the fiber optic tester 10, to test a variety of the fiber optic cables 28 and/or devices in different configurations.

Figure 2B:
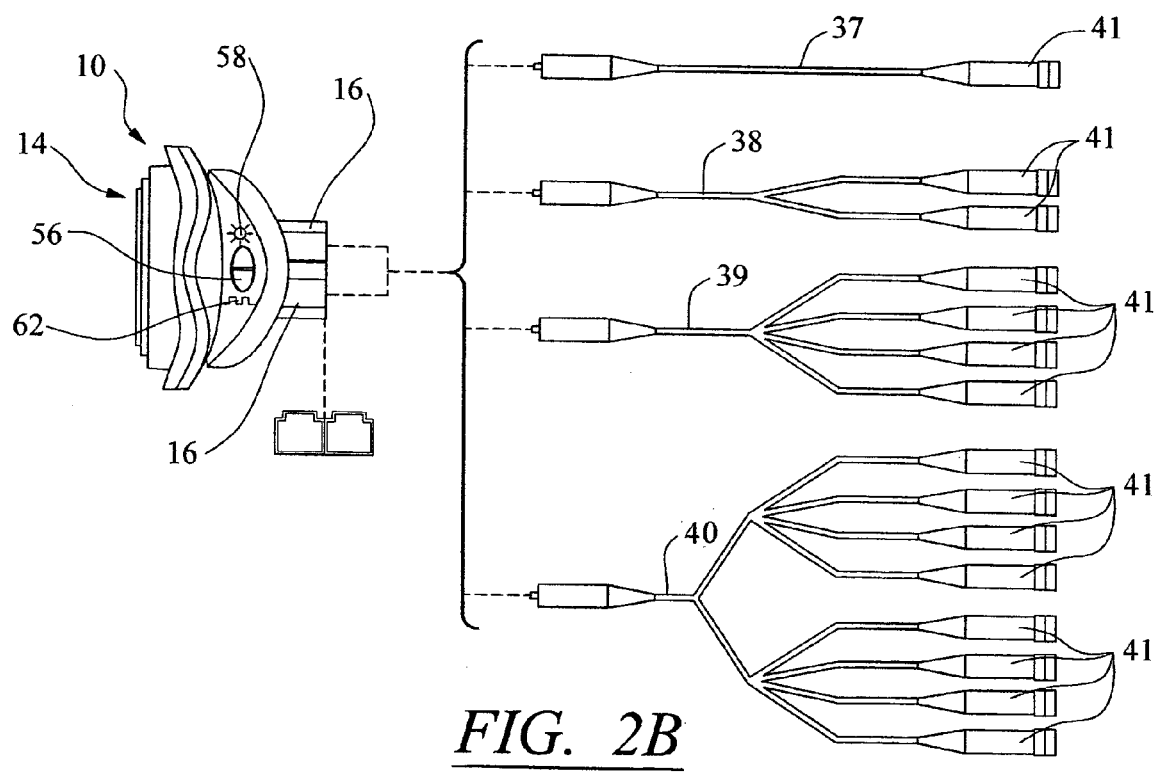
FIG. 2B is a top view of the fiber optic tester showing other alternate adapters of the fiber optic tester.

FIG. 2B shows optional alternate adapters 37, 38, 39, or 40, which are substantially the same as the optional alternate adapters 33, 34, 35, or 36, respectively, except that the optional alternate adapters 37, 38, 39, or 40 have other alternate connectors 41, which are substantially female connectors, and the optional alternate adapters 33, 34, 35, or 36 have the other connectors 24, which are substantially male connectors.

Figure 2C:
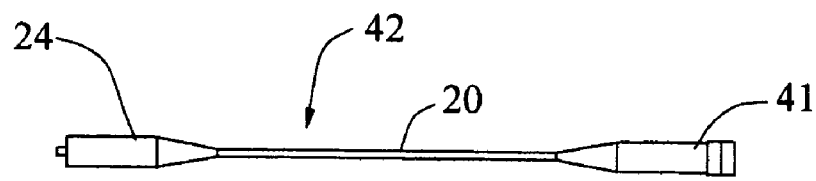
FIG. 2C is a top view of the fiber optic tester showing another alternate adapter of the fiber optic tester.

Other suitable connectors may be used with the optional alternate adapters 33, 34, 35, or 36 in lieu of the other connectors 24 and/or other suitable connectors may be used with the optional alternate adapters 37, 38, 39, or 40 in lieu of the other alternate connectors 41. The adapter fiber optic cables 20 of the optional alternate adapters 33, 34, 35, or 36 and/or the adapter fiber optic cables 20 the optional alternate adapters 37, 38, 39, or 40 may have the connectors 24, the other alternate connector 41, or a combination thereof connected thereto, although other suitable connectors may be used FIG. 2C shows an optional alternate adapter 42 having the adapter fiber optic cable 20 and the other connector 24 opposing the other alternate connector 41. The optional alternate adapter 42 may be used to adapt the substantially male other connectors 24 of the optional alternate adapters 33, 34, 35, or 36 for use as substantially female connectors. The optional alternate adapter 42 may also be used to adapt the substantially female other connectors 41 of the optional alternate adapters 37, 38, 39, or 40 for use as substantially male connectors.

Figure 2D:
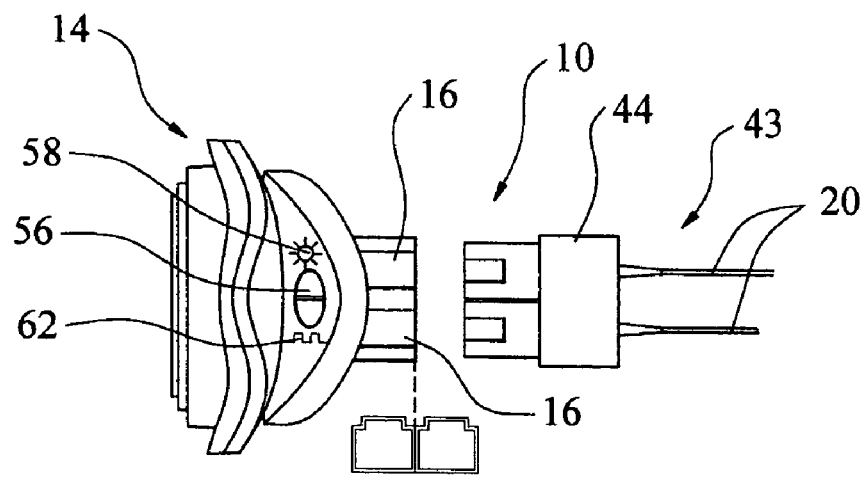
FIG. 2D is a top view of the fiber optic tester showing another alternate adapter of the fiber optic tester.

FIG. 2D shows another optional alternate adapter 43 having a first dual connector 44, which may be removably connected to the housing connectors 16. The adapter fiber optic cables 20 are also shown. The adapter fiber optic cables 20 may have the connectors 24, the other alternate connector 41, or a combination thereof connected thereto, although other suitable connectors may be used.

Figure 2E:
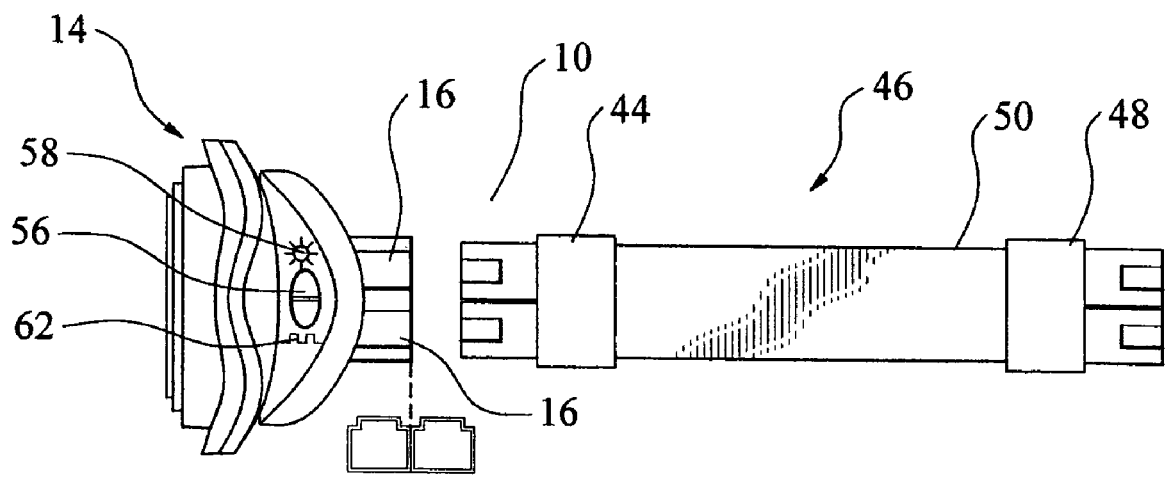
FIG. 2E is a top view of the fiber optic tester showing another alternate adapter of the fiber optic tester.

FIG. 2E shows another optional alternate adapter 46 having the first dual connector 44, which may be removably connected to the housing connectors 16. The first dual connector 44 and other dual connector 48 are opposingly connected to optical transmission medium 50 having dual light paths therethrough.

Any of the optional alternate adapters 33-40, 42, 43, or 46 may be used alone, as a plurality of the same and/or different ones of the optional alternate adapters 33-40, 42, 43, or 46, or in any combination. Other suitable adapters may additionally and/or alternatively be used.

Figure 3:
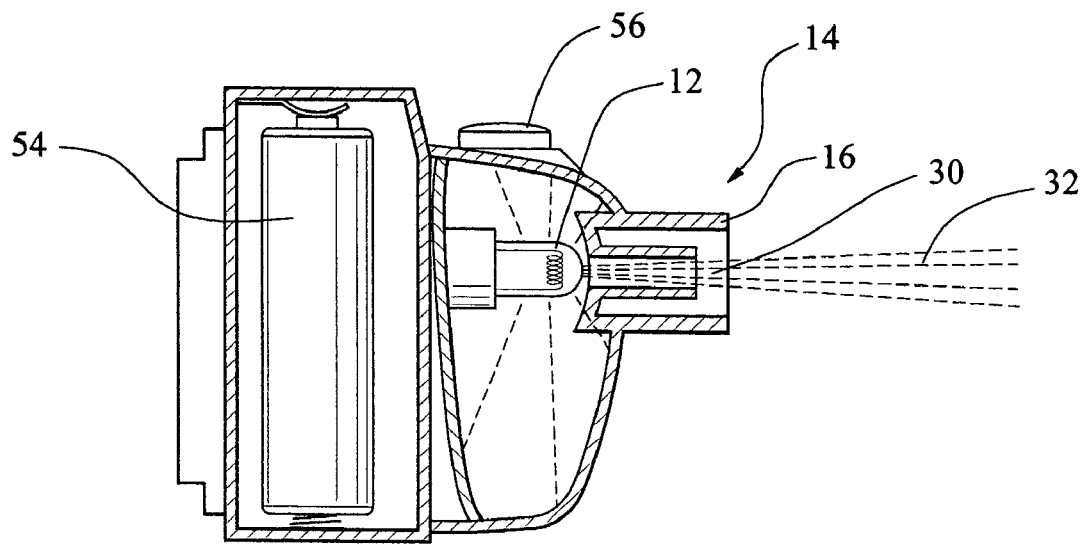
FIG. 3 is a cross section view a housing of the fiber optic tester.

FIG. 3 shows a cross section view of the housing 14 of the fiber optic tester 10.

Figure 4:
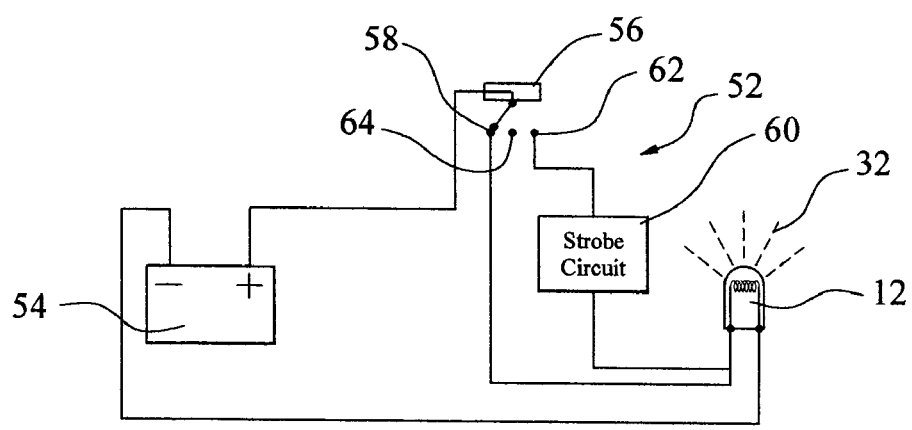
FIG. 4 is a diagrammatic representation of the fiber optic tester shown in constant light output mode.
Figure 5:
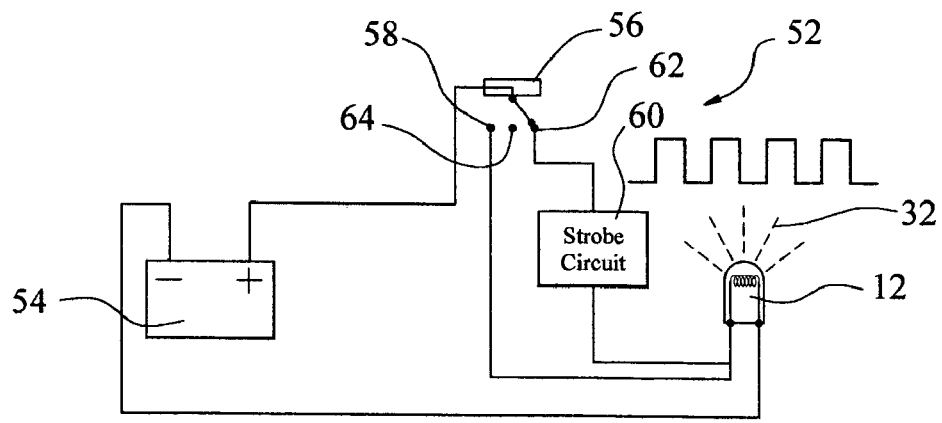
FIG. 5 is a diagrammatic representation of the fiber optic tester shown in strobe light output mode.

FIGS. 4 and 5 are diagrammatic representations of the fiber optic tester 10, showing the fiber optic tester 10 in constant light output mode and in strobe light output mode, respectively.

The fiber optic tester 10 has circuit 52 having the light source 12 and power supply 54 in series, when switch 56 is switched into the constant light output mode with the switch 56 in switch position 58, as shown in FIG. 4.

The fiber optic tester 10 has circuit 52 having the light source 12, the power supply 54, and strobe circuit 60 in series, when the switch 56 is switched into the strobe light output mode with the switch 56 in switch position 62, as shown in FIG. 5.

The fiber optic tester 10 may be turned off, when the switch 56 is switched into off position 64. The switch 56 is accessible at the exterior of the housing 14. The light source 12 may be a light bulb or other suitable light source. The power supply 54 may be a battery or other suitable power supply; the switch 56 may be a single pole triple throw switch or other suitable switch; and the strobe circuit 60 may be an electronic circuit, such electronic circuits being well known in the art, and may comprise a solid state circuit or other suitable circuit, or other suitable strobe.

Upon connecting the fiber optic tester 10 to the fiber optic cables 28 and/or devices to be tested, either directly or through the intermediate connectors 67, if used, and switching the fiber optic tester 10 on to either the constant light output mode or the strobe light output mode, by switching the switch 56 to either the switch position 58 or 62, respectively, the light 32 is emitted from the light source 12 into the fiber optic cables 28 to be tested; and upon viewing, observing, or detecting light output 65, or absence thereof, from the fiber optic cables 28, device or devices, or other suitable location in a fiber optic system having the fiber optic cables 28 an/or device or devices to be tested, a technician can determine whether light is being transmitted through the fiber optic cables 28 and/or device or devices being tested and, thus, determine whether or not the fiber optic cables 28 and/or device or devices are suitable for use in the fiber optic system. The intermediate connectors 67 may alternatively and/or additionally be tested in like manner. The fiber optic tester 10 may, thus, be used as a continuity tester, and, thus, be used to determine whether or not there are breaks and/or continuity in the fiber optic cables 28 and/or continuity through the intermediate connectors 67, and the device and/or devices being tested.

FIGS. 6 and 7 show the fiber optic tester 10 in constant light output mode and strobe light output mode, respectively, the light 32 emitted from the light source 12 being substantially constant light when the fiber optic tester 10 is in the constant light output mode and strobe light when the fiber optic tester 10 is in the strobe light output mode. The strobe light output mode may be used to facilitate viewing, observing, or detecting the light 32 emitted from the fiber optic cables 28 being tested under certain surrounding light conditions, such as, for example, during extremely bright surrounding ambient light conditions or other conditions. The fiber optic tester 10 may optionally have the same and/or different optional colored filters at the housing connectors 16 to distinguish the light 32 emitted from the light source 12, which is directed through the light paths 30 and directed to the fiber optic connectors 26 connected to the fiber optic cables 28 and/or device or devices to be tested, which may be helpful during certain light conditions.

FIGS. 8A, 8B, 9A, 9B, and 10 show the fiber optic tester 10 in different test configurations.

Figure 8A:
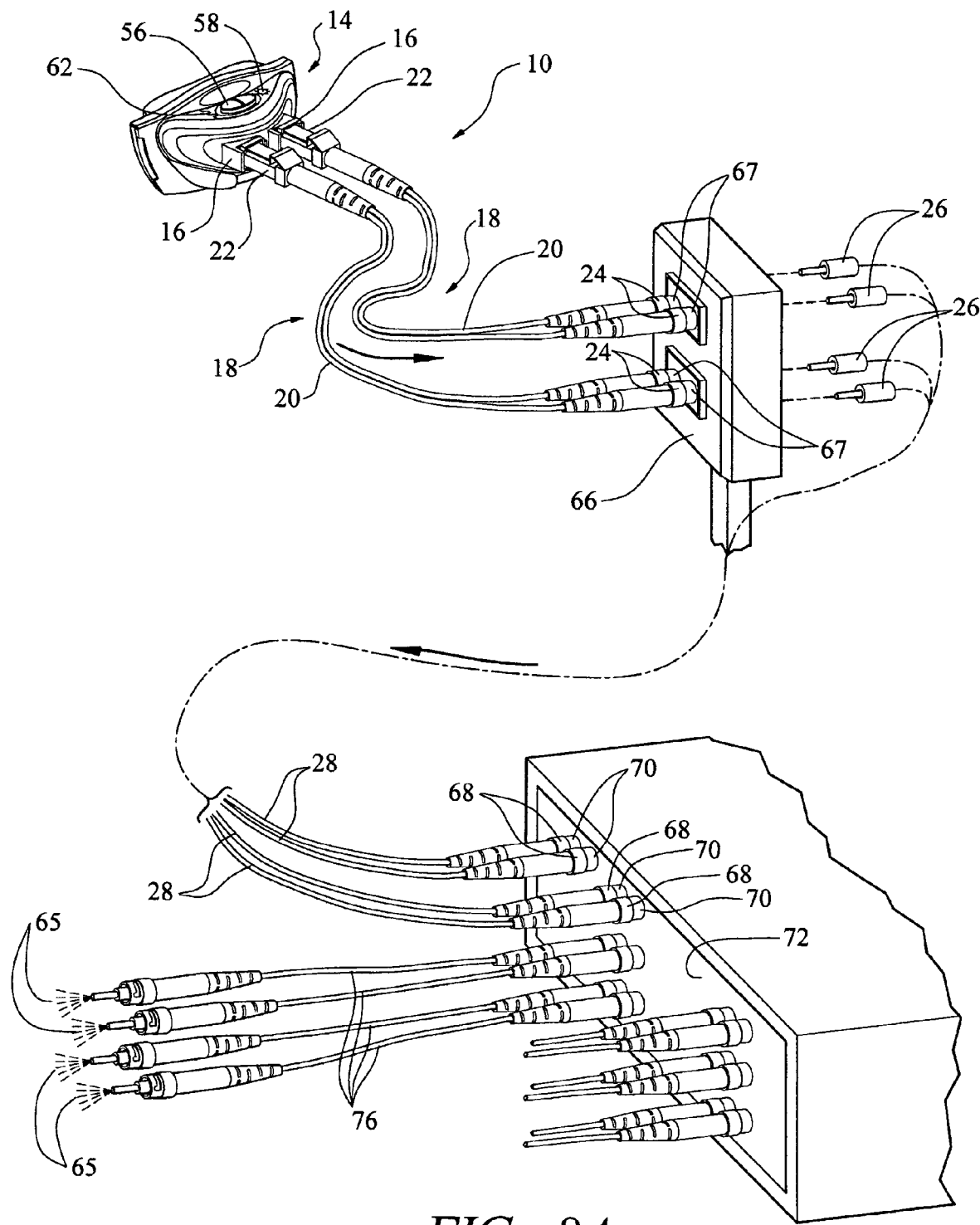
FIG. 8A is a perspective view of the fiber optic tester in a test configuration.

FIG. 8A shows the fiber optic tester 10 being used to test the fiber optic cables 28. The fiber optic cables 28 have the fiber optic connectors 26 and fiber optic connectors 68 opposing the fiber optic connectors 26. Wall plate 66 has the intermediate connectors 67. The fiber optic connectors 26 of the fiber optic cables 28 are matingly connected to the intermediate connectors 67 of the wall plate 66. The fiber optic connectors 68 of the fiber optic cables 28 are connected to connectors 70 of distribution panel 72. The other connectors 24 of the adapter fiber optic cable 20 of the fiber optic tester 10 are removably connected to the intermediate connectors 67 of the wall plate 66; the fiber optic tester 10 is turned on, and the presence of the light output 65, or absence thereof, from other fiber optic cables 76 connected to the distribution panel 72 is determined.

Light from the fiber optic cables 28 is transmitted through the distribution panel 72 and into the other fiber optic cables 76. The light output 65, or absence thereof, is determined by viewing, observing, or detecting the light output 65 from the other fiber optic cables 76. If the light output 65 is emitted from the other fiber optic cables 76, then there is continuity from the fiber optic tester 10 through to the ends of the other fiber optic cables 76. If there is a break between the fiber optic tester 10 and any of the ends of the fiber optic cables 76, then no light will be emitted from the ends of the other fiber optic cables 76 in the path of the break. The fiber optic tester 10 may then be used to test the continuity of the intermediate connectors 67, the fiber optic cables 28, the distribution panel 72, and/or the fiber optic cables 76, by a process of substitution, in which the fiber optic cable 28, and/or the portion of the distribution panel 72, and/or the fiber optic cable 76 and/or the intermediate connectors 67 may be removed and a properly working component may be substituted.

Figure 8B:
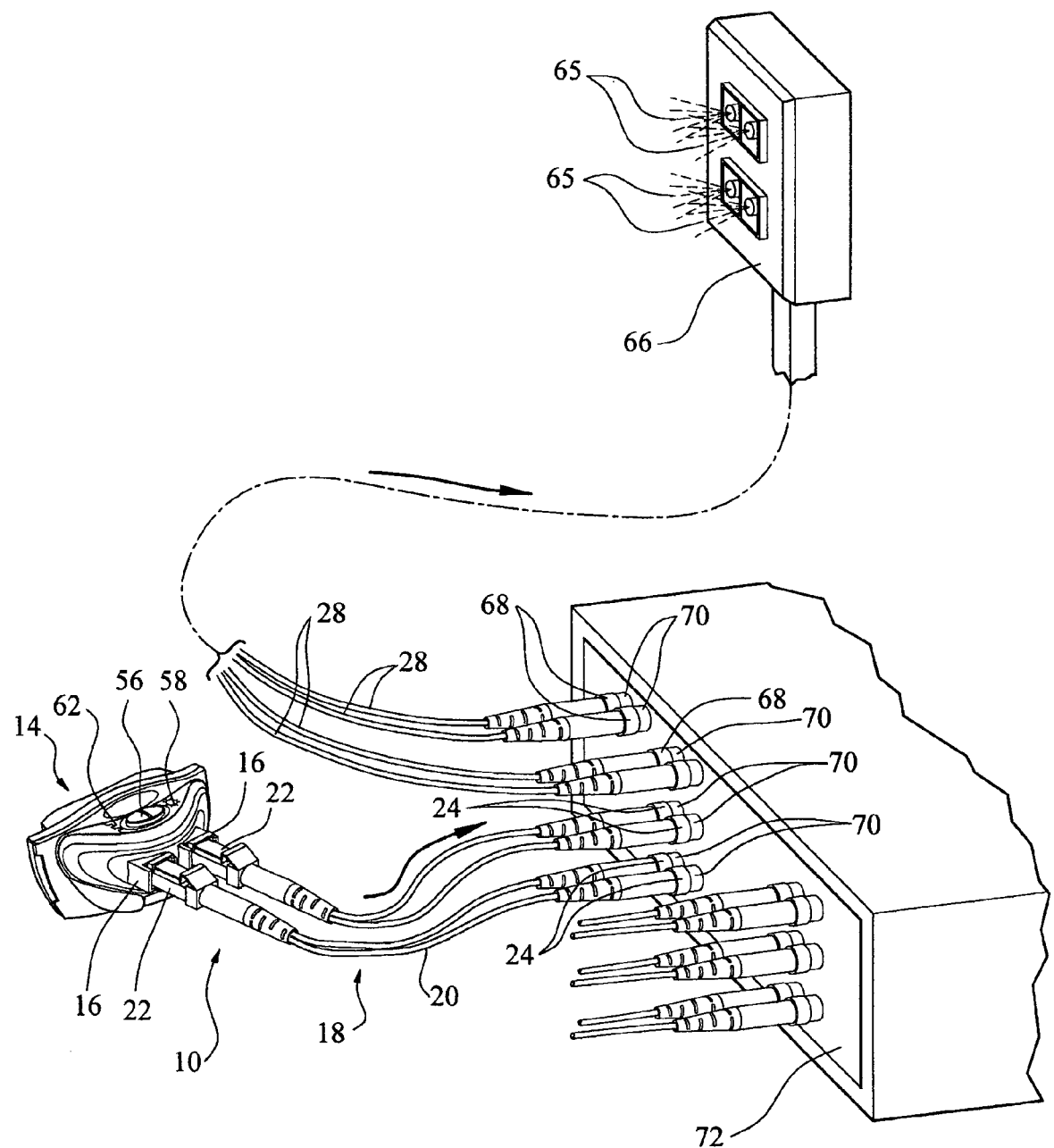
FIG. 8B is a perspective view of the fiber optic tester in an alternate test configuration.

FIG. 8B shows the fiber optic tester 10 being used to test the fiber optic cables 28 in the reverse direction from that of FIG. 8A.

Figure 9A:
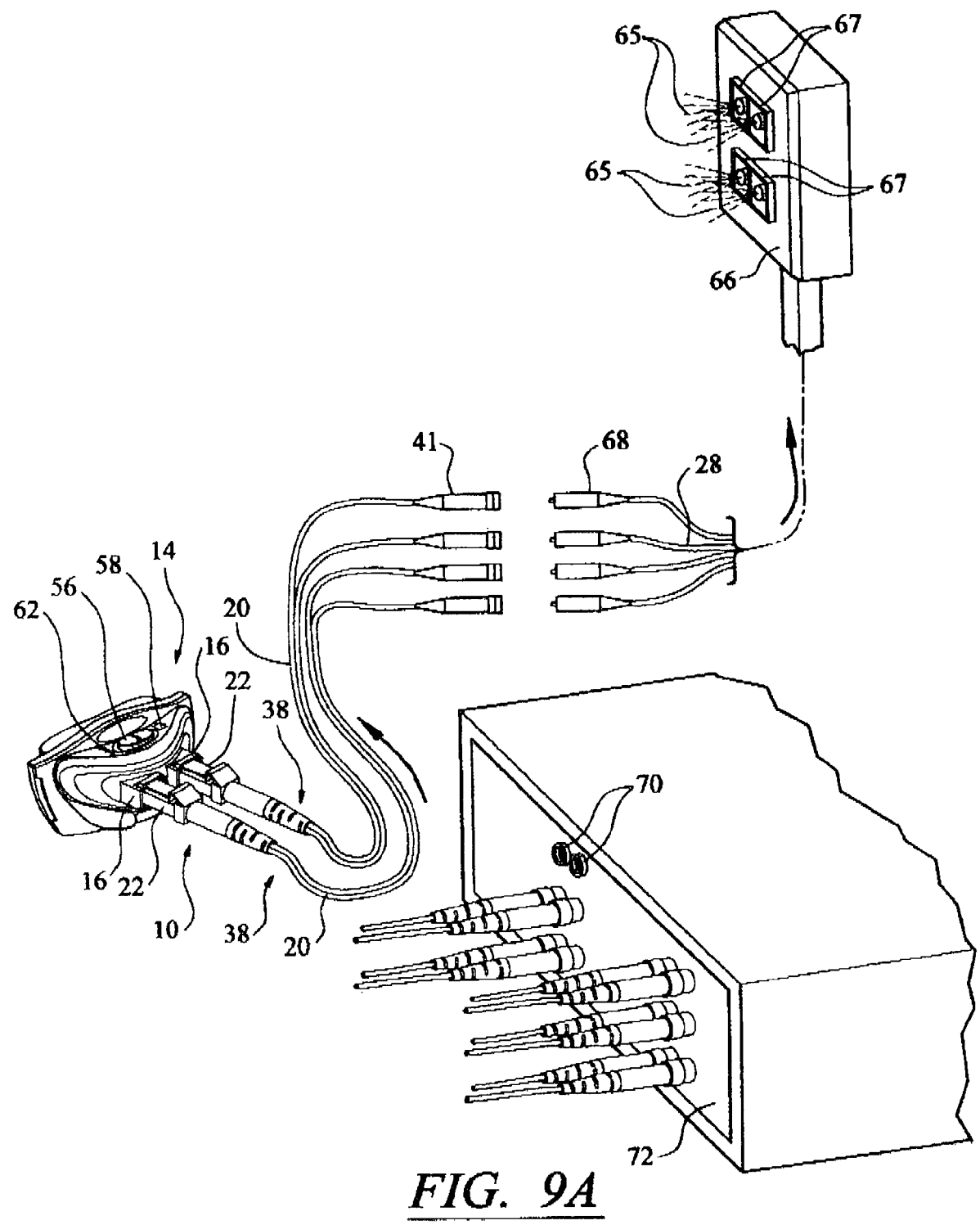
FIG. 9A is a perspective view of the fiber optic tester in another alternate test configuration.

FIG. 9A shows the fiber optic tester 10 being used to test the fiber optic cables 28. The other alternate connectors 41 of the optional alternate adapters 38 of the fiber optic tester 10 are connected to the fiber optic connectors 68 of the fiber optic cables 28. The fiber optic connectors 26 of the fiber optic cables 28 are connected to the intermediate connectors 67 of the wall plate 66. Continuity or a break in continuity in the fiber optic cables 28 and/or the intermediate connectors 67 may be determined by viewing, observing, or detecting the light output 65, or absence thereof, from the intermediate connectors 67. In the absence of light from the intermediate connectors 67, the intermediate connectors 67 and/or the fiber optic cables 28 may be removed and properly working components may be substituted.

Figure 9B:
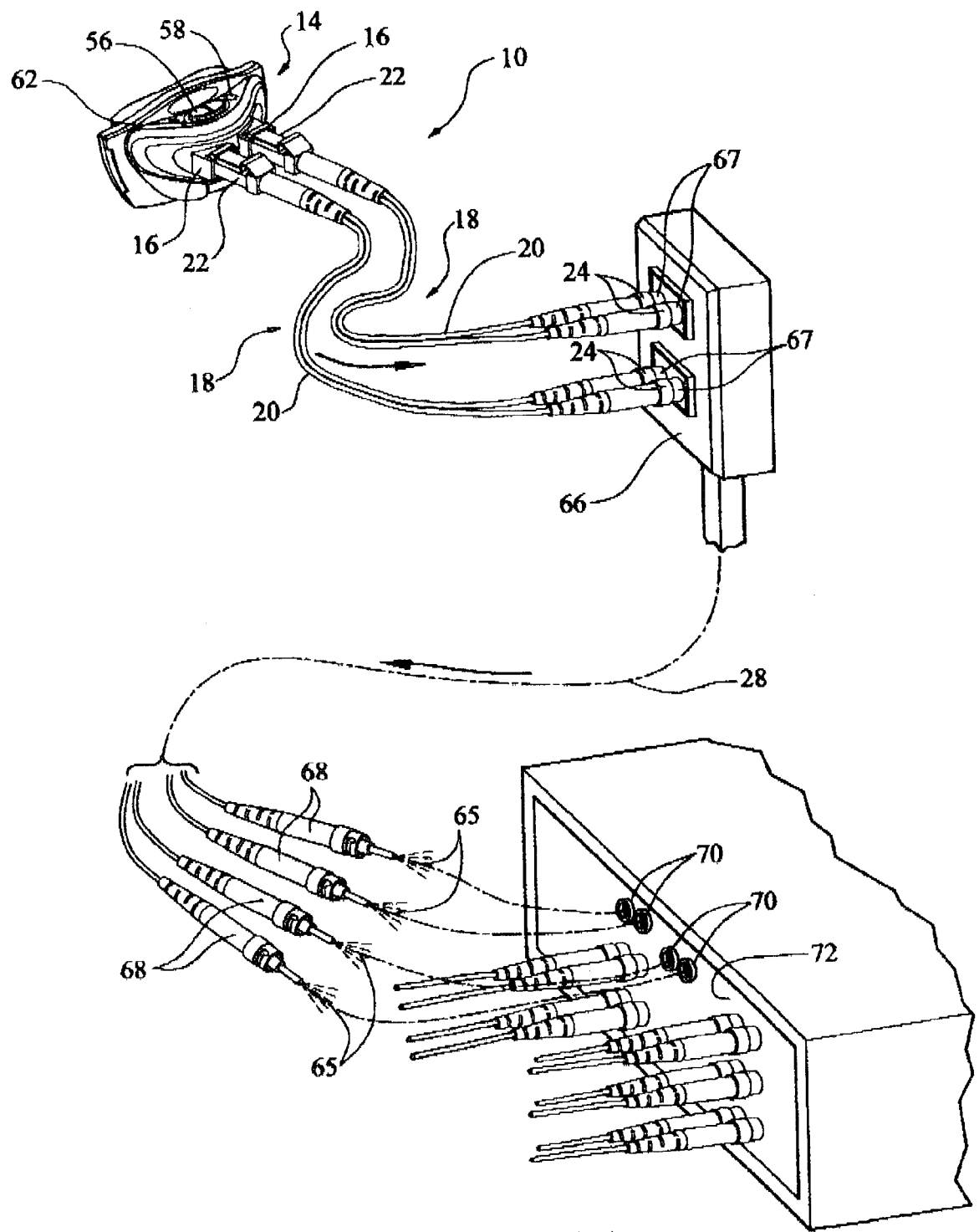
FIG. 9B is a perspective view of the fiber optic tester in another alternate test configuration.

FIG. 9B shows the fiber optic tester 10 being used to test the fiber optic cables 28 in the reverse direction from that of FIG. 9A.

Figure 10:
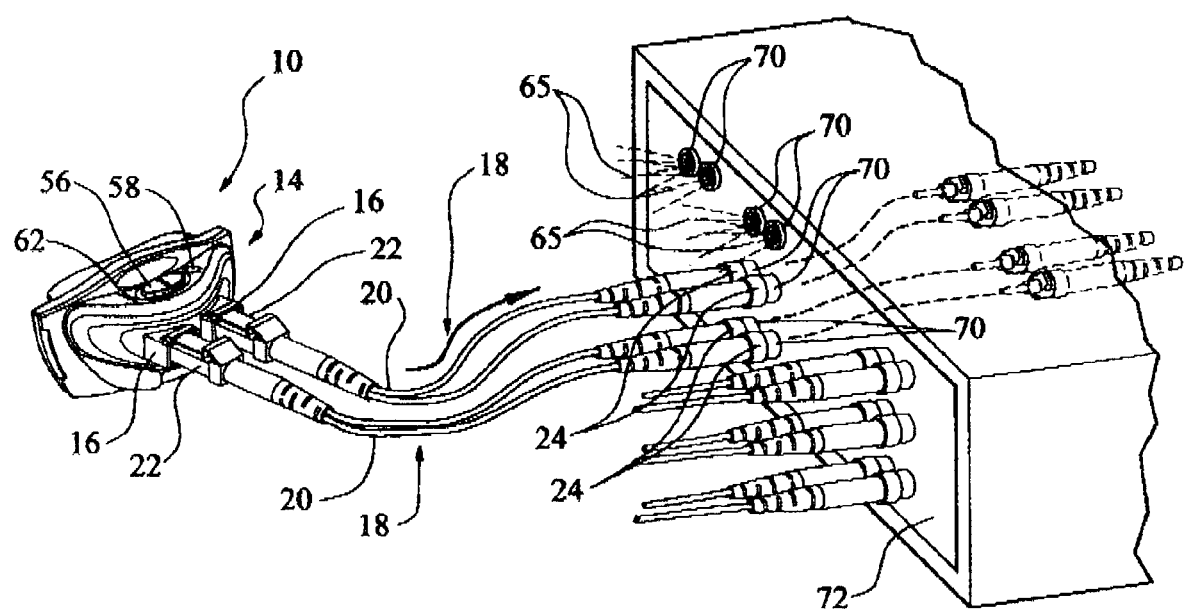
FIG. 10 is a perspective view of the fiber optic tester in another alternate test configuration.

FIG. 10 shows the fiber optic tester 10 being used to test the fiber optic cables 28 within the distribution panel 72.

Figure 11:
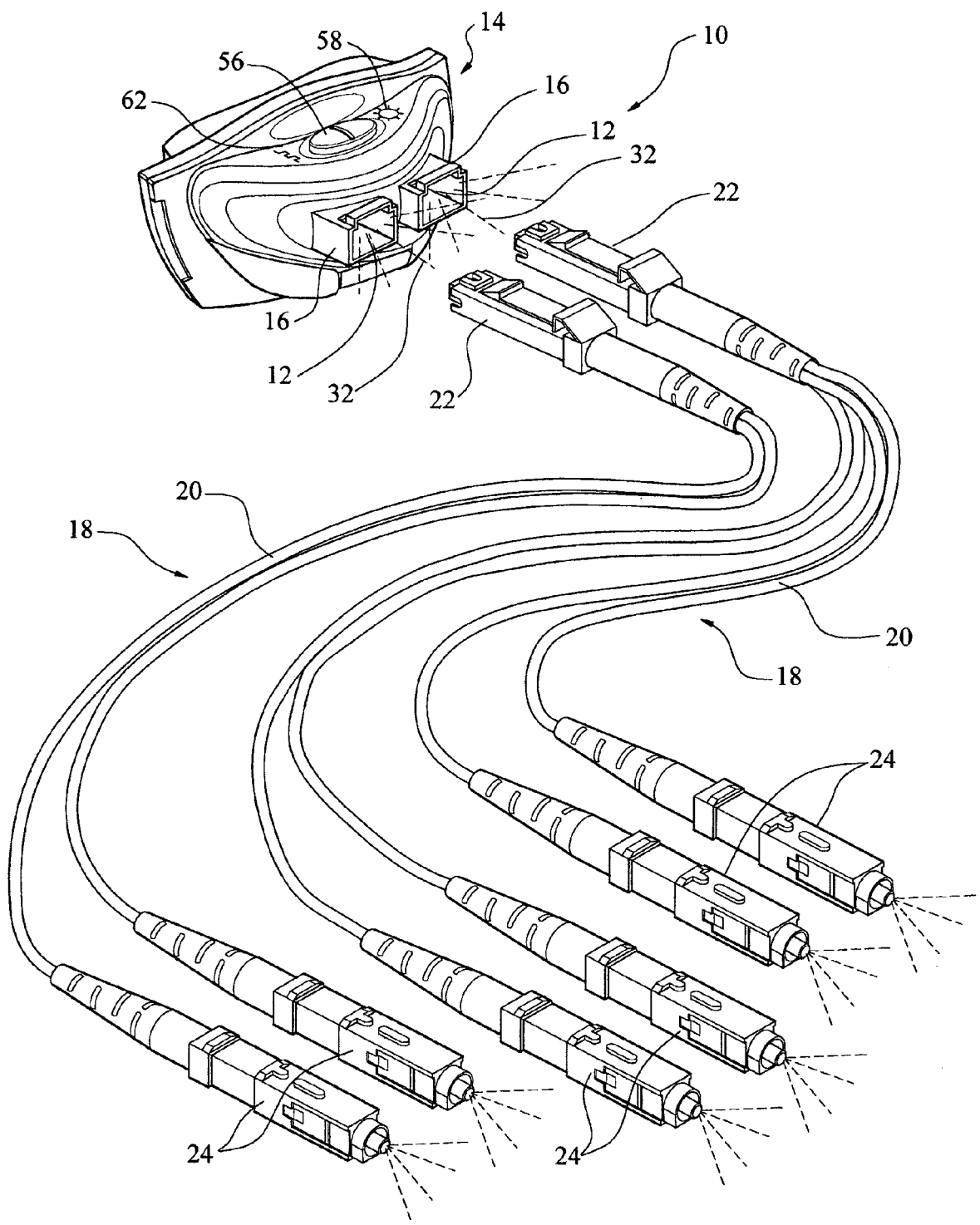
FIG. 11 is a perspective view of the fiber optic tester shown with different ones of the adapters of FIG. 2A.

FIG. 11 shows the fiber optic tester 10 comprising one of the adapters 18 having two of the adapter fiber optic cables 20 and an alternate one of the adapters 18 having four of the adapter fiber optic cables 20. Each of the adapters 18 has one of the first connectors 22, and each of the fiber optic cables 20 has one of the other connectors 24 opposing the first connector 22.

Figure 12:
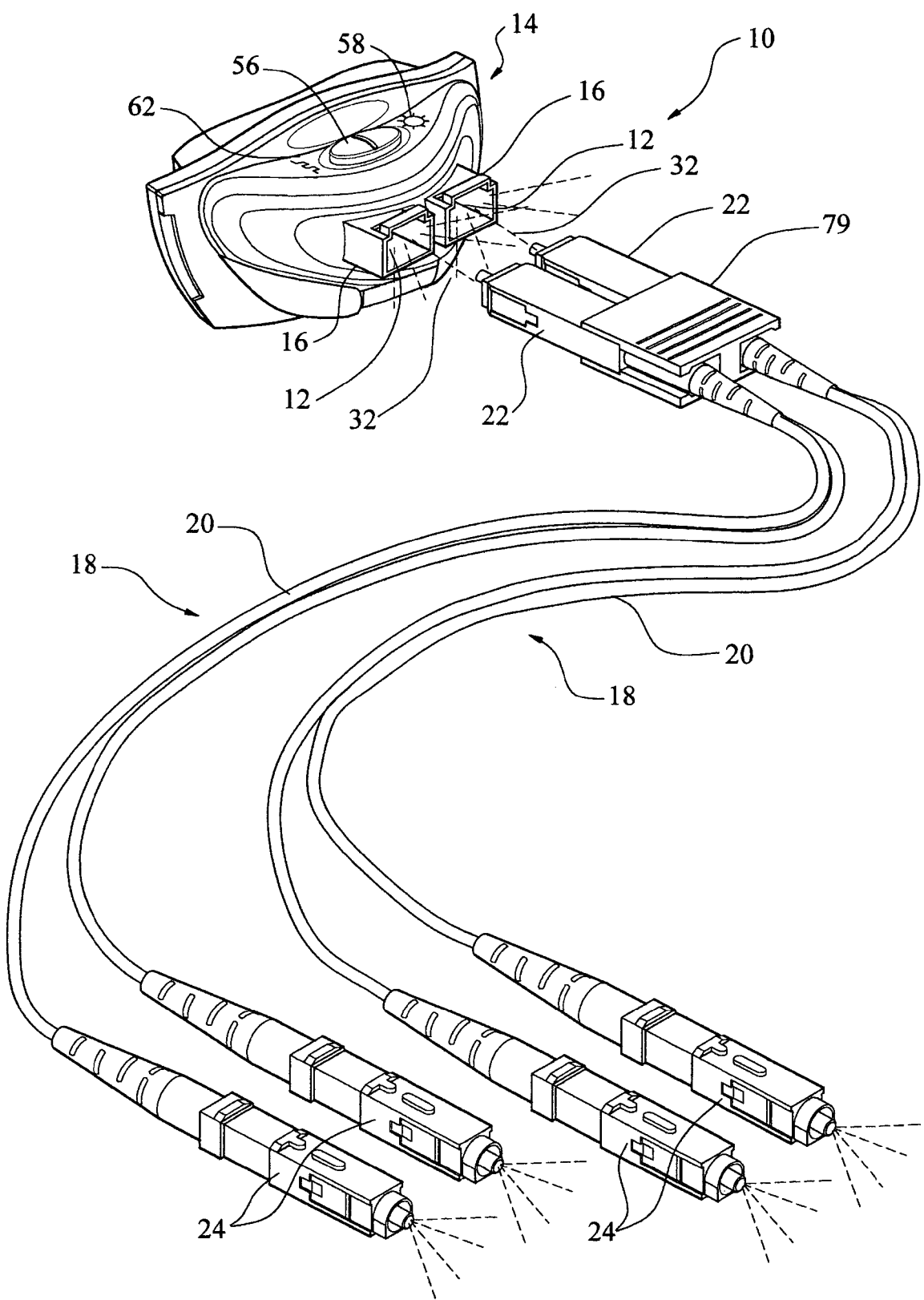
FIG. 12 is a perspective view of the fiber optic tester shown with an adapter holder.

FIG. 12 shows the fiber optic tester 10 having a holder 79, which holds the adapters 18. The fiber optic tester 10 may be used to test the fiber optic cables 28 and/or a device or devices in a variety of configurations. The fiber optic tester 10 may be removably and matingly connected to different types of the fiber optic connectors 26, the intermediate connectors 67, the wall plates 66, the distribution panels 72, cables, patch panels, devices, in other suitable installations, each of which typically have at least one input connector and at least one output connector.

The other connectors 24 of the fiber optic tester 10 are typically connected to the input connector or connectors of the device and/or devices being tested, and the output connectors are typically observed to determine the presence and/or absence of light at the output connectors. If light is emitted from the output connectors, then there is continuity from the fiber optic tester 10 through to the output connector or connectors of the device or devices being tested. If there is a break between the fiber optic tester 10 and any of the output connectors of the device or devices being tested, then no light is emitted from the connectors of the device or devices in the path or paths of the break or breaks.

The fiber optic connectors 26 may be MT-RJ, SC, ST, LC, FDDI, FC, VF-45, or other suitable connectors. The fiber optic connectors 26 may be installed in the wall plates 66, the distribution panels 72, cables, patch panels, devices, in other suitable installations, or not installed. The fiber optic tester 10 may be of thermoplastics, thermosetting polymers, rubber, metal, such as aluminum or steel, or other suitable material or combination thereof.

Figure 13:
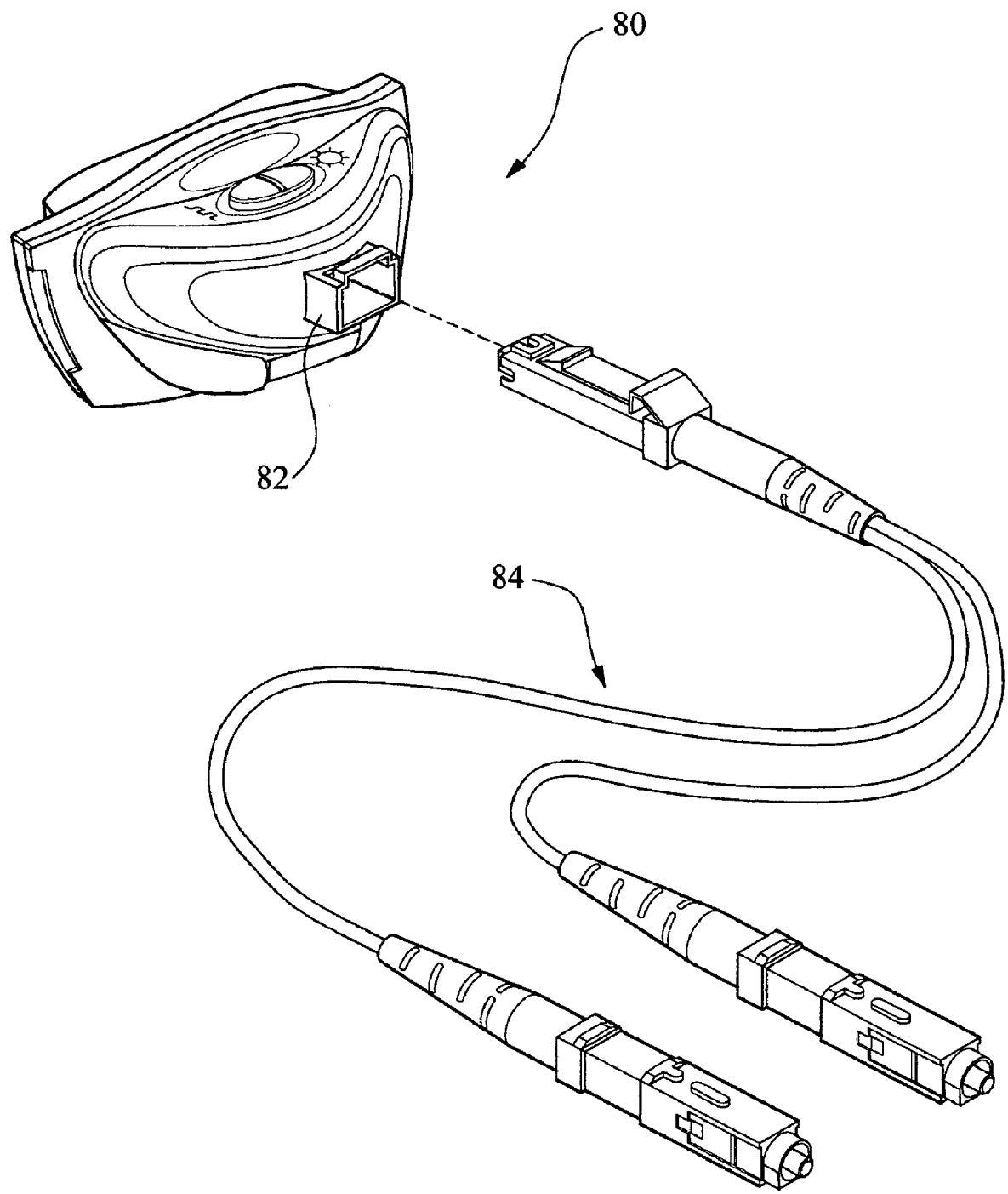
FIG. 13 is a perspective view of an alternate fiber optic tester, constructed in accordance with the present invention.

FIG. 13 shows an alternate embodiment of a fiber optic tester 80, which is substantially the same as the fiber optic tester 10, except that the fiber optic tester 80 has one housing connector 82 and one adapter 84.

Figure 14:
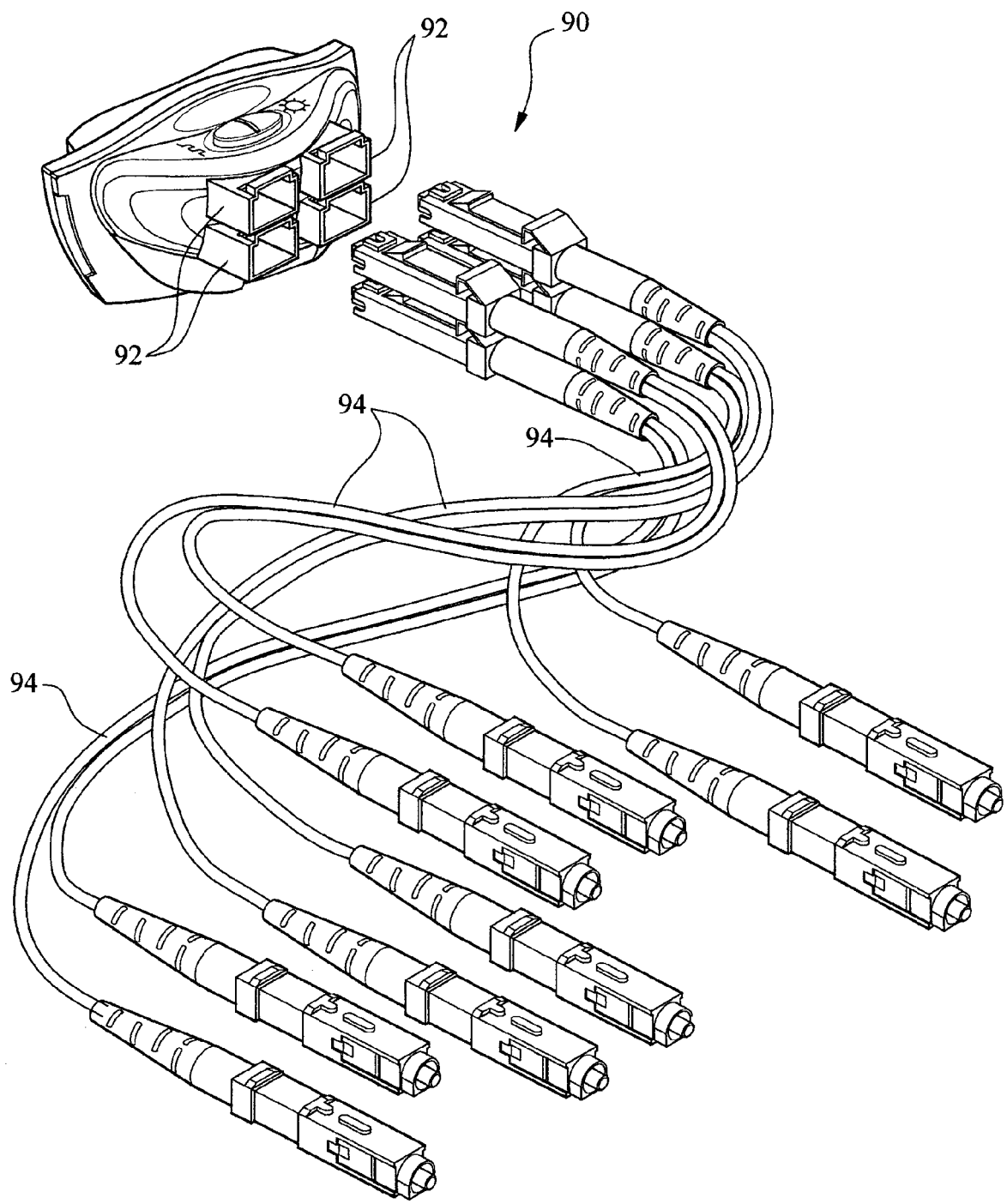
FIG. 14 is a perspective view of an alternate fiber optic tester, constructed in accordance with the present invention.

FIG. 14 shows an alternate embodiment of a fiber optic tester 90, which is substantially the same as the fiber optic tester 10, except that the fiber optic tester 90 has four housing connectors 92 and four adapters 94.

The fiber optic testers 10, 80, and 90 are portable handheld fiber optic testers, may be used in a variety of installations and configurations, but are especially useful in the field by a technician, during installation, maintenance, and/or testing fiber optic cables, patch panels, distribution panels, wall plates, and/or a device or devices where speed, safety, and efficiency are important. The fiber optic testers 10, 80, and 90 may be used by a field technician for testing a variety and plurality or multiplicity of connectorized fiber optic cables and/or devices simultaneously. The fiber optic testers 10, 80, and 90 are quick, versatile, easy and simple to use, easily and quickly adaptable for use with different systems and configurations, inexpensive, long lasting, light weight, safe to use, attractive, sturdy, and durable, and capable of being used in the field for testing the fiber optic cables in a variety of systems, installations, and circumstances. The fiber optic tester 10 may be used as a continuity tester to determine whether or not there are breaks in the fiber optic cables and/or device or devices being tested. The fiber optic testers 10, 80, and 90 are portable handheld fiber optic testers capable of being used in the field.

Although the present invention has been described in considerable detail with reference to certain preferred versions thereof, other versions are possible. Therefore, the spirit and scope of the appended claims should not be limited to the description of the preferred versions contained herein.

What is claimed is:

1. A fiber optic tester for testing at least two fiber optic devices substantially simultaneously, each of the fiber optic devices having at least one input connector, at least one output connector, and at least one fiber optic device light path which directs light received at the at least one input connector to the at least one output connector when the at least one fiber optic device light path is unbroken, comprising:
   a housing having a light source and at least two housing connectors,
      said light source interior to said housing;
   at least two adapters, each said adapter having at least one first connector and at least one second connector,
      said first connectors removably and matingly connected to said housing connectors;
      said second connectors adapted to removably and matingly connect to said fiber optic device input connectors;
   said housing having a housing light path, which directs light emitted from said light source through said housing connectors into said first connectors;
   each said adapter having an adapter light path from said at least one first connector to said at least one second connector, which directs light received from said housing at said at least one first connector to said at least one second connector and into at least one of said at least two fiber optic device input connectors, when said second connectors are removably and matingly connected to said fiber optic device input connectors;
   a power source, a three position switch, and a strobe circuit, wherein:
      said power source and said light source are in series when said switch is in a first position, and said light source emits a substantially constant light output;
      said power source is disconnected from said light source when said switch is in a second position, and said light source emits no light;
      said power source, said strobe circuit, and said light source are in series when said switch is in a third position, and said light source emits a strobe light output.

2. The fiber optic tester according to claim 1, wherein:
   said at least two fiber optic devices are from the group consisting of fiber optic devices, fiber optic cables, patch panels, distribution panels, wall plates, intermediate fiber optic devices, intermediate fiber optic connectors, at least one intermediate fiber optic connector and any combination of the foregoing, at least one intermediate fiber optic device and any combination of the foregoing, and any combination thereof.

3. The fiber optic tester according to claim 1, wherein said fiber optic tester is a portable fiber optic field tester.

4. The fiber optic tester according to claim 1, wherein said fiber optic tester is a portable handheld fiber optic tester.

5. The fiber optic tester according to claim 1, wherein:
   said light received at said at least one output connector when said at least one fiber optic device light path is unbroken is emitted from said at least one output connector; and
   said light received at said at least one input connector is not emitted from said at least one output connector when said at least one fiber optic device light path is broken.

6. The fiber optic tester according to claim 1, wherein said fiber optic tester is constructed of materials from the group consisting of thermoplastics, thermosetting polymers, rubber, metal, aluminum, steel, and any combination thereof.

7. The fiber optic tester according to claim 1, wherein at least one of said at least two adapters has said at least one second connector comprising at least two second connectors.

8. The fiber optic tester according to claim 1, wherein at least two of said at least two adapters have said at least one second connector comprising at least two second connectors.

9. The fiber optic tester according to claim 1, wherein at least one of said at least two adapters has said at least one second connector comprising at least four second connectors.

10. The fiber optic tester according to claim 1, wherein at least one of said at least two adapters has said at least one second connector comprising at least eight second connectors.

11. The fiber optic tester according to claim 7, wherein another at least one of said at least two adapters has said at least one second connector comprising at least four second connectors.

* * * * *